United States Patent [19]
Ketels et al.

[11] Patent Number: 5,856,391
[45] Date of Patent: Jan. 5, 1999

[54] POLYMER MIXTURE BASED ON POLYPHENYLENE ETHER AND TALCUM

[75] Inventors: Hendrikus Hubertus Theodoor Maria Ketels, Huybergen; Cinzia Aurora Rita di Fede; Hermannus Bernardus Savenije, both of JE Putte, all of Netherlands

[73] Assignee: General Electric Company, Pittsfield, Mass.

[21] Appl. No.: 804,160

[22] Filed: Dec. 6, 1991

[30] Foreign Application Priority Data

Jan. 29, 1991 [NL] Netherlands ............... 9100149

[51] Int. Cl.⁶ ............... C08K 3/20; C08L 71/12
[52] U.S. Cl. ............... 524/451; 525/68; 525/92
[58] Field of Search ............... 524/451; 525/92, 525/68

[56] References Cited

U.S. PATENT DOCUMENTS

| | | | |
|---|---|---|---|
| 3,835,200 | 9/1974 | Lee, Jr. | 525/68 |
| 3,994,856 | 11/1976 | Katehman et al. | 525/89 |
| 4,113,800 | 9/1978 | Lee, Jr. | 525/89 |
| 4,252,913 | 2/1981 | Katchman et al. | 525/92 |
| 4,277,575 | 7/1981 | Haaf et al. | 525/89 |
| 4,293,478 | 10/1981 | Sugio et al. | 524/451 |
| 4,483,958 | 11/1984 | Kosaka et al. | 524/409 |
| 4,863,997 | 9/1989 | Shibuya et al. | 525/68 |
| 5,034,459 | 7/1991 | Haaf et al. | 525/68 |
| 5,086,105 | 2/1992 | Abe et al. | 525/68 |

FOREIGN PATENT DOCUMENTS 2375297  6/1978  France .

*Primary Examiner*—Vasu Jagannathan
*Assistant Examiner*—Olga Asinovsky

[57] ABSTRACT

The invention relates to a polymer mixture based on a polyphenylene ether, a polystyrene and/or a high-impact polystyrene, an agent to improve the impact strength, and talcum. By using a mixture of two linear block copolymers as agent (C), a polymer mixture is obtained having a favourable combination of low gloss, good impact strength and a good flow in the melt.

6 Claims, No Drawings

POLYMER MIXTURE BASED ON POLYPHENYLENE ETHER AND TALCUM

The invention relates to a polymer mixture based on a polyphenylene ether, polystyrene and/or high-impact polystyrene, an agent to improve the impact strength, and talcum, and to articles formed from the polymer mixture.

Such mixtures are described in U.S. Pat. No. 4,483,958. The known polymer mixtures comprise a polyphenylene ether, a high impact polystyrene, a thermoplastic elastomer and an inorganic filler. The filler may be talcum. These known polymer mixtures have a high gloss and a good impact strength according to Izod, due to the use of a weight ratio between the quantity of inorganic filler and thermoplastic polymer of more than two. It appears from a comparative example of this Patent Specification that a lower gloss is obtained when a weight ratio of 4:6 (comparative example 6) is used.

This invention provides polymer mixtures which comprise the constituents described hereinbefore and which have a good impact strength, minimal gloss and good flow properties of the polymer melt.

The polymer mixture according to this invention is characterised in that the polymer mixture is composed as follows:
A. 20–60 parts by weight of a polyphenylene ether,
B. 40–70 parts by weight of a polystyrene or a high-impact polystryrene,
C. 5–20 parts by weight of an agent to improve the impact strength,
D. 2–10 parts by weight of talcum (sometimes referred to as "take"), the agent (C) being a mixture of two linear block copolymers.

It has been found that the desired combination of properties is difficult to obtain or cannot be obtained when inorganic fillers other than talcum are used. By combination of a mixture of two agents to improve the impact strength it has been found possible to obtain a good combination of impact strength, flow properties and low gloss.

The agent to improve the impact strength (constituent C) preferably comprises:
C1. 35–65% by weight of a linear A-B1-A' block copolymer and
C2. 35–65% by weight of a linear A"-B2-A'" block copolymer, wherein
A, A', A" and A'" are equal or different terminal blocks which are derived from a vinylaromatic compound and have a weight-averaged molecular weight from 2,000 to 100,000;
B1 is a block derived from a conjugated diene monomer, and
B2 is a block derived from one or more alkylene monomers, the blocks B1 and B2 having a weight-averaged molecular weight from 10,000 to 500,000.

The polymer mixture is preferably composed so as to comprise 20–35 parts by weight of constituent A, 45–65 parts by weight of constituent B, 10–15 parts by weight of constituent C and 4–8 parts by weight of constituent D.

The polymer mixture according to the invention comprises at any rate one or more of the following constituents:
A. a polyphenylene ether;
B. a polystyrene and/or a high-impact polystyrene;
C. a mixture of at least two block copolymers as defined in the Claims;
D. talcum.

In addition to the constituents mentioned herein-before the polymer mixture may comprise one or more of the additives conventionally used for polymer mixtures, for example, stabilisers, agents to improve the flame-retarding properties, dyes, pigments and plasticisers.

The polymer mixture according to the invention can be obtained according to the conventional techniques for preparing polymer mixtures. The polymer mixture according to the invention is preferably manufactured by compounding.

The polymer mixture according to the invention may be formed according to the conventional techniques for processing synthetic resins to articles, for example, by extrusion or by injection moulding.

The nature of the constituents to be used will be described in greater detail hereinafter.

A. POLYPHENYLENE ETHER

Polyphenylene ethers are generally known polymers. All polyphenylene ethers known per se may be used in the polymer mixtures according to the invention. An elaborate enumeration of suitable polyphenylene ethers is to be found, for example, in WO 87/00540.

Particularly suitable are poly(2,6-dimethyl-1,4-phenylene)ether, poly(2,6-diethyl-1,4-phenylene)ether, poly(2-methyl-6-ethyl-1,4-phenylene)ether. It is also possible to use copolymers, for example, copolymers which comprise units derived from 2,3,6-trimethyl phenol and from 2,6-dimethyl phenol.

B. POLYSTYRENE AND/OR HIGH-IMPACT POLYSTYRENE

High-impact polystyrene consists of a mixture of a rubber and a polystyrene prepared from a vinylaromatic compound, for example, styrene itself and/or alpha-methyl styrene and/or dimethyl styrene compounds. The rubber usually consists of a conjugated diolefin polymer, for example, polybutadiene. Other suitable rubbers are EPDM and acrylate rubbers. It is also possible to use a polystyrene without rubber.

C. AGENT TO IMPROVE THE IMPACT STRENGTH

The polymer mixture according to the invention comprises a mixture of at least two linear block copolymers as an agent to improve the impact strength. The mixture preferably comprises a mixture of:
C1. 35–65% by weight of a linear A-B1-A' block copolymer and
C2. 35–65% by weight of a linear A"-B2'A'" block copolymer, wherein
A, A', A" and A'" are equal or different terminal blocks which are derived from a vinylaromatic compound and have a weight-averaged molecular weight from 2,000 to 100,000;
B1 is a block derived from a conjugated diene monomer, and
B2 is a block derived from one or more alkylene monomers, the blocks B1 and B2 having a weight-averaged molecular weight from 10,000 to 500,000.

The agent even more preferably comprises a mixture of 40–60% by weight of constituent C1 and 60–40% by weight of constituent C2.

As stated hereinbefore, the terminal blocks A, A', A" and A'" are derived from vinylaromatic compounds. Suitable vinylaromatic compounds are styrene, alpha-methyl styrene, vinyl toluene, vinyl xylene and vinyl naphthalene. A, A', A" and A'" may be equal or different.

C. TALCUM

The polymer mixture according to the invention comprises talcum. The talcum to be used preferably has a particle size between 1.5 and 10 micrometres. Particles smaller than 1.5 micrometres result in a polymer mixture having less favorable properties. Talcum particles having a size of more than 10 micrometers result in a deterioration of the impact strength according to Izod.

The invention will now be described in greater detail with reference to the ensuing specific examples.

EXAMPLES

The following constituents were used in the examples below:

PPE: a polyphenylene ether derived from 2,6-dimethylphenol having an intrinsic viscosity of 38 ml/g measured at 25° C. in chloroform.

HIPS: a high-impact polystyrene having a butadiene rubber; rubber content approximately 10% by weight.

I.M. 1: a linear block copolymer A-B1-A', wherein A and A' are polystyrene blocks and B1 is a polybutadiene block, having a weight ratio of the total of the styrene blocks to the polybutadiene block of approximately 30 to 70 and a number-averaged molecular weight of the block copolymer of approximately 60,000.

I.M. 2: a linear block copolymer A"-B2-A''', wherein A" and A''' are polystyrene blocks having a number-averaged molecular weight of 16,000 and B2 is an ethylene-butylene copolymer having a number-averaged molecular weight of 78,000, with a weight ratio of the styrene blocks to ethylene-butylene blocks of 30/70 and an average molecular weight by number of the block copolymer of about 110,000.

Talcum: a talcum product having an average particle size of 4.5 micrometres.

Stab: a mixture of conventionally used stabilisers.

C.B.: carbon black

PE: polyethylene

The constituents mentioned hereinbefore were compounded in an extruder in the quantities recorded in the table hereinafter. The average temperature adjustment of the extruder was 280° C.

Standardised test pieces were manufactured from the polymer mixtures thus obtained in an injection molding machine. The test pieces were subjected to the following tests. The impact strength was determined according to Izod (ASTM 256) and according to DIN 53443 (Falling Dart Impact) at room temperature and at minus 30° C. The gloss was determined according to ASTM D523 at an angle of 60° and of 85°. The melt viscosity was measured according to ASTM D3835 at a shearing rate of 1,500 per second. The results are also recorded in the table hereinafter.

TABLE

| Example | A* | B* | C* | I |
|---|---|---|---|---|
| Composition (parts by weight) | | | | |
| PPE | 27.9 | 27.9 | 27.9 | 27.9 |
| HIPS | 54.6 | 54,6 | 54.6 | 54.6 |
| I.M. 1 | — | — | 13.5 | 6.75 |
| I.M. 2 | 13.5 | 13.5 | — | 6.75 |
| Talcum | — | 6.0 | 6.0 | 6.0 |
| Stab | 0.6 | 0.6 | 0.6 | 0.6 |
| C.B. | 1.9 | 1.9 | 1.9 | 1.9 |
| PE | 1.5 | 1.5 | 1.5 | 1.5 |

*comparative examples

TABLE-continued

| Properties | | | | |
|---|---|---|---|---|
| Izod impact strength (J/M) | | | | |
| 23° C. | 458 | 280 | 331 | 305 |
| −30° C. | 170 | 88 | 167 | 121 |
| Falling Dart Impact (J) | | | | |
| 23° C. | 52 | 65 | 65 | 71 |
| −30° C. | 80 | 55 | 58 | 49 |
| Gloss | | | | |
| 60° | 25 | 15 | 7 | 11 |
| 85° | 80 | 65 | 46 | 57 |
| Melt viscosity | | | | |
| (Pa · s) at 1500 s$^{-1}$ | 170 | 176 | 219 | 184 |

It may be seen from the results as recorded in the table that the polymer mixture according to the invention (Example I) has an optimum combination of impact strength, low gloss and low melt viscosity. Comparative example A has the best impact strength according to Izod and the best flow properties, but for many applications its gloss is too high. Addition of talcum to the composition according to comparative example A results in a decrease of the gloss, but also in a substantial reduction of the impact strength at room temperature and at lower temperatures (see comparative example B). Replacing the agent to improve the impact strength (i.e. I.M.1) by another agent (i.e. I.M.2) results in an improvement of the impact strength, in a further reduction of the gloss, but in too high an increase of the melt viscosity (see comparative example C). By using a mixture of I.M. 1 and I.M. 2 (example I according to the invention) a good combination of impact strength, low gloss and melt viscosity is obtained, with a remarkably good Falling Dart impact strength.

All the patent publications mentioned hereinbefore are considered to be incorporated in this text by reference.

We claim:

1. A polymer mixture comprising:
   (A) 20–60 parts by weight of polyphenylene ether resin;
   (B) 40–70 parts by weight of a polymer selected from the group consisting of polystyrene and high impact polystyrene;
   (C) 5–20 parts by weight of a impact strength agent comprising 35–65% by weight of a linear A-B1-A' block copolymer based on the total weight of the impact strength agent, and 35–65% by weight of a linear A'-B2-A''' block copolymer, wherein A, A', A" and A''' are each independently terminal blocks which are derived from a vinylaromatic compound and have a weight-average molecular weight from 2,000–100,000; B1 is a block derived from a conjugated diene monomer; B2 is a block derived from one or more alkylene monomers, wherein blocks B1 and B2 have a weight-average molecular weight from 10,000–500,000; and
   (D) 2–10 parts by weight of talcum.

2. The polymer mixture of claim 1, wherein B1 is a block derived from 1,3 butadiene monomer, and B2 is a block derived from ethylene and butylene monomers.

3. The polymer mixture of claim 1, wherein said polymer mixture has a gloss of about 11 as measured according to ASTM D523 at an angle of 60°, and a melt viscosity of about 184 pascal seconds at 1500 seconds.

4. The polymer mixture of claim 1, wherein said polymer mixture consists essentially of said polyphenylene ether resin, said polymer (B), said impact strength agent, and said talcum.

5. The polymer mixture of claim 4, wherein said mixture consists essentially of 20–35 parts by weight of component (A), 45–65 parts by weight of component (B), 10–50 parts by weight of component (C), and 4–8 parts by weight of component (D).

6. A polymer mixture consisting of:
   (A) 20–60 parts by weight of polyphenylene ether resin;
   (B) 40–70 parts by weight of a polymer selected from the group consisting of polystyrene and high impact polystyrene;
   (C) 5–20 parts by weight of a impact strength agent comprising 35–65% by weight of a linear A-B1-A' block copolymer based on the total weight of the impact strength agent, and 35–65% by weight of a linear A"-B2-A'" block copolymer, wherein A, A', A" and A'" are each independently terminal blocks which are derived from a vinylaromatic compound and have a weight-average molecular weight from 2,000–100,000; B1 is a block derived from a conjugated diene monomer; B2 is a block derived from one or more alkylene monomers, wherein blocks B1 and B2 have a weight-average molecular weight from 10,000–500,000; and
   (D) 2–10 parts by weight of talcum.

* * * * *